Jan. 3, 1950            J. W. GRAY            2,493,669

MODULATOR

Filed Nov. 3, 1948

Inventor
JOHN W. GRAY
*H. L. Mackey*
Attorney

Patented Jan. 3, 1950

2,493,669

UNITED STATES PATENT OFFICE 2,493,669

MODULATOR

John W. Gray, White Plains, N. Y., assignor to General Precision Laboratory Incorporated, a corporation of New York Application November 3, 1948, Serial No. 58,140

11 Claims. (Cl. 321—44)

1

This invention relates to the use of a modulator to convert a direct voltage to an alternating voltage.

A purpose of this invention is the inversion or conversion of a small direct voltage to a more easily amplified alternating voltage.

One use of this invention, for instance, is in the control of an industrial process in accordance with the variation of a small direct voltage, such as that of a thermocouple. When this invention is so applied, it inverts the direct voltage to a proportional alternating voltage, which then can be conveniently amplified and used to actuate a servo control for automatic operation.

Another use of this invention is to secure an indication directly and strictly proportional to a small direct voltage otherwise difficult to measure except by laboratory types of equipment. In this use, the invention inverts the direct voltage to an alternating voltage which changes phase when the signal changes sign. The alternating voltage is amplified, part is detected and rectified in a phase-sensitive detector and fed back to neutralize the direct signal, and the amount of neutralization required is indicated on an output meter.

Heretofore the usual methods of accomplishing such purposes were by the use of a direct current differential amplifier, or by the use of a vibrating reed or other type of chopper. These methods have well-known disadvantages. The direct current differential amplifier is a laboratory instrument and has inherent zero instability over periods of time, requiring continuous manual attention to resetting the zero. Vibrating reed and photocell choppers have moving parts and often generate a square wave with a hiatus of some sort every half cycle where the output voltage curve crosses the zero line.

The present invention makes use of elements stable enough in zero setting with relation to the magnitude of the input signal that resetting is not required after the initial zero adjustment. Additionally the invention consists of apparatus having no moving parts and which may secure its square alternating carrier voltage from a multivibrator, also having no moving parts. Thus the instant invention employs a rugged apparatus as distinguished from laboratory instruments, providing a practical method of accurate industrial utilization of small direct voltage signals.

These and other objects and advantages of this invention will be apparent from the following detailed description when considered with the accompanying drawings, in which.

Figure 1:
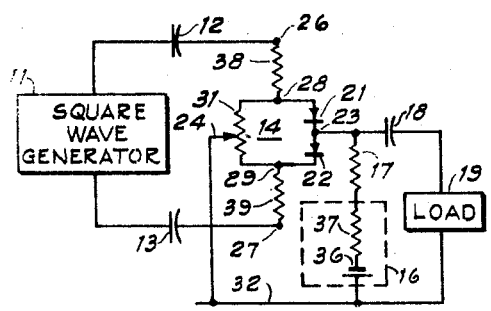
Figure 1 is a schematic wiring diagram of a preferred form of modulator for smaller direct current signals.

One preferred embodiment of this invention is shown in Fig. 1 for use when the direct voltage input signal is of the order of 100 millivolts; that is, for illustration only and not as a limitation, within the range of +200 to —200 millivolts. Input signals outside of this range will operate the equipment, but with less efficiency, in the sense that the output voltage will be a less proportion of the input voltage and consequently other methods may be superior. For input voltages larger than 200 millivolts a second embodiment of this invention is preferred and will be described later.

It will of course be understood that, throughout this specification when a direct voltage input signal is mentioned it may either be representative of a direct voltage quantity or may be derived from a shunt the voltage across which is representative of a direct current through the same. It will also be understood that as voltage and current are both present in any closed circuit, when an alternating or direct current quantity is mentioned throughout this specification it is intended to mean broadly electrical flow without restriction to either current manifestations or voltage manifestations alone.

In Fig. 1, square wave generator 11 feeds resistance network 14 through coupling condensers 12 and 13. This network, with terminals 26 and 27, consists of resistor 38 in series with two rectifiers 21 and 22 and a second resistor 39, a third resistor 31 being connected in parallel with the rectifiers 21 and 22. Rectifiers 21 and 22 are preferably of the crystal type, such as germanium, although they might be of any other type, such as thermoelectric diodes, dry disc copper oxide or selenium rectifiers, or silicon, galena, carborundum or other rectifying crystals. They are connected in series aiding, the forward direction or direction of lesser resistance of the pair in relation to the remainder of the circuit being immaterial. Resistance network 14 is tapped at the common junction between the two rectifiers and at an intermediate point on resistor 31 which is preferably made adjustable by the movable contact 24. Across these tapped points there is connected in series a resistor 17 and a direct voltage signal source 16, the magnitude of which is to be ascertained and the physical embodiment of which is here indicated diagrammatically by a dotted rectangle enclosing a battery 36 and resistance 37. Output leads from the terminals of resistor 17 are taken, preferably through a blocking condenser 18, to utilizing or load equipment 19 which may be for example, an alternating current thermionic tube amplifier.

In operation, the resistance of rectifiers 21 and 22 is of one value when the voltage of square wave generator 11 produces a positive potential at point 26 and a corresponding forward current flow through the rectifiers, and of another value during the following half cycle when the potential at point 26 is negative with a corresponding backward current flow through the rectifiers. Corresponding to these two values of resistance offered by rectifiers 21 and 22 there will be two values of resistance between points 28 and 29 consisting of the fixed resistance of resistor 31 in parallel with that of the rectifiers, neglecting for the present other circuits attached at point 23. Also there will be two corresponding values of resistance observed between points 23 and 24. But these points 23 and 24 with that portion of network 14 which is between them are also part of a closed input circuit including an input source 16 illustrated as the battery 36 and resistance 37, resistor 17 and return bus 32.

Figure 2:
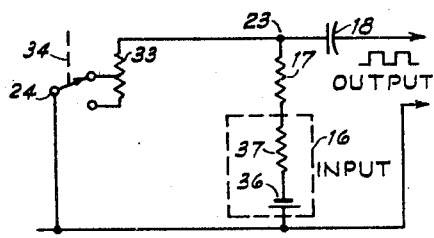
Figure 2 is an equivalent circuit of the output portion of the modulators shown in Figs. 1 and 7.

Fig. 1 can now be redrawn as Fig. 2, with the resistance between points 23 and 24 represented as a single equivalent varying resistor 33. Two-point switch 34 represents the alternation between two certain values of resistance produced every half cycle by square wave generator 11, Fig. 1. It is then obvious that, as the resistance of resistor 33 alternates from one value to the other, the voltage at point 23 produced by voltage of the input source 16 and controlled by voltage drops through resistances 33 and 17 will vary correspondingly, so that the output voltage through condenser 18 will have a square form and will be related to the input voltage and the associated resistors by Ohm's law. As a result, in Fig. 1 an easily amplified square alternating voltage which is a function of the input direct voltage of source 16 will be delivered to load 19, which may be a conventional and stable alternating current thermionic tube amplifier.

Best operation obtains when the input signal internal resistance 37 is small in comparison with resistor 17 and the latter is intermediate in size between the two values of resistor 33 (see Fig. 2). Also, for best operation, it is preferable that the value of resistance between points 28 and 29, Fig. 1, should be small compared with the sum of resistances 38 and 39. Additionally values of condensers 12 and 13 and the frequency (typically 60 cycles) of generator 11 should be so related that during a half cycle the voltage between points 26 and 27 will not drop markedly, and the value of the sum of resistances 38 and 39 should be so large with relation to the resistance between points 28 and 29 that the current through resistors 38 and 39 will not be greatly different in successive half cycles. For best utilization of the characteristics of crystal rectifiers it is preferred that the current through them be kept low. In the use of germanium, a typical design calls for a current in the order of 25 microamperes.

The load 19, Fig. 1, will normally be an alternating current amplifier of any conventional design, for the principal utility of this invention is the inversion of a difficulty measured or amplified small direct current voltage to an easily amplified proportional alternating voltage. Input signal 16, represented as a direct potential 36 in series with a low internal resistance 37, may be of either polarity, that is to say, either the positive or negative side of source 36 may be toward point 23. The voltage produced by square wave generator 11 should be exactly rectangular for best results, and for the values of input signal heretofore mentioned may be of the order of 3 volts.

Figure 4:
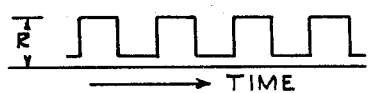
Figures 4 and 5 illustrate graphs of various cyclic resistance variations which may obtain under different conditions.
Figure 3:
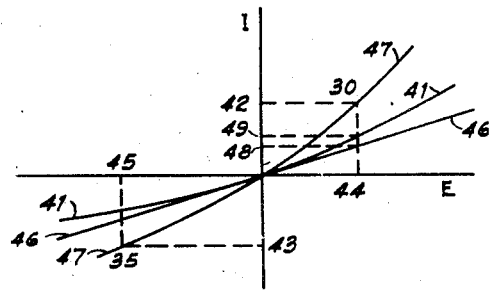
Figure 3 depicts graphs of voltage-current relations in the circuit of Fig. 1.
Figure 5:
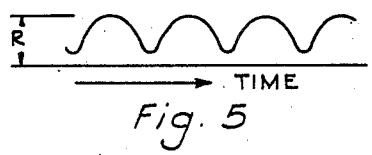

The reason for requiring the carrier input wave to be square is evident by referring to Fig. 3, in which 41 is a characteristic curve for small currents through two germanium crystal rectifiers in series. The voltage-current curve for resistor 31, Fig. 1, parallelling the rectifiers is indicated by the straight line 46, and since for any given voltage, as for example, 44, (Fig. 3) between points 28 and 29, (Fig. 1) the currents are easily found from the graphs to be as indicated by points 48 and 49, their sum can be computed and plotted at point 30 with a value represented by the ordinate 42. By such a process curve 47 may be drawn as the sum of curves 41 and 46, and represents the total current between points 28 and 29 for varying applied voltages, the net resistance at any point being the reciprocal of the slope of the curve. From these curves can be calculated the resistances between points 23 and 24 for any voltages applied by the square wave generator. When this generator presents a square potential wave alternating between two values of potential, represented in Fig. 3 by values 44 and 45, the effective resistances of rectifiers 21 and 22 alternate or jump between two specific values indicated on Fig. 3 by the reciprocals of the slopes of curve 41 at the indicated points. However, if the output of generator 11 were other than a square wave, for example, a sinusoid, the resistance of rectifiers 21 and 22 in series would vary progressively as the varying slope of the curve 41 between point 44 and point 45 and the output to load 19 would not be a true representation of the wave form generated by the generator 11. Fig. 4 indicates the wave form of variation of resistance between points 23 and 24, Fig. 1, when generator 11 output is square wave, and Fig. 5 indicates the asymmetrical type of wave which would be obtained if generator 11 output were sinusoidal in which case the resistance would be a complex function of the sinusoidal voltage at point 28, Fig. 1, and the equation of curve 47, Fig. 3. The output voltage would be similar in shape to that of Fig. 5.

Figure 6:
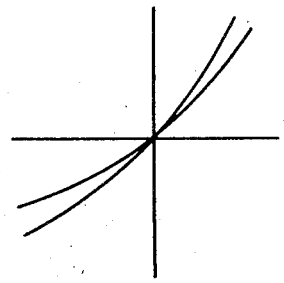
Figure 6 depicts the voltage-current characteristics of several crystal rectifiers.

Fig. 6 represents the characteristic curves for two slightly dissimilar germanium crystal rectifiers. If two such dissimilar rectifiers were inserted as 21 and 22, Fig. 1, their resistances under the same current flow would be different, therefore a midpoint of resistor 31 would not be at the potential of common point 23, and even in the absence of a signal voltage 16, an output potential would be obtained. To eliminate this potential, in this invention the return point at the middle of resistor 31 is variable, and connection 24 is adjusted for zero output with zero signal input. When the carrier is a square wave, it is possible with this adjustment to cause the output to remain at zero, when the D.-C. input is zero, throughout the cycle. This is attributable to the fact that only two conditions of voltage and current, as shown by the dashed ordinates and abscissae in Fig. 3, exist during a cycle of the carrier. If any other wave shape is employed, a continuum of different conditions exists, and it will, in general, be impossible to eliminate the effects of dissimilar crystal or diode curves for all parts of the cycle. This will produce a residual, irregular waveform output at zero D.-C. input, and will also distort the output waveform when the input is not zero.

This method of zero setting, arrangement of the network and values of its components, suggested current values through the rectifiers, and other factors all contribute to stability of the zero setting and minimization of erroneous output under conditions of field use in spite of the drift with time of rectifier elements and of differences between individual rectifiers. The achievement of great zero stability constitutes a principal utility of this invention.

Figure 7:
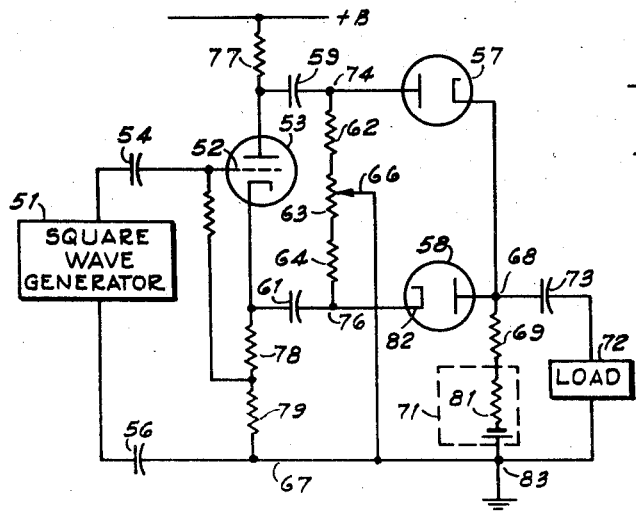
Figure 7 is a schematic wiring diagram of a preferred form of modulator for larger direct current signals.

When larger signal voltages, such as, say, to 50 volts, are to be inverted to alternating voltage to facilitate proportional amplification, the modified form of Fig. 7 is deemed preferable in order to maintain across the bridge circuit a carrier potential which is the same on successive half cycles. Thermionic diode rectifiers are used because their back current is zero for higher voltages, permitting the use of high resistance in resistor 69 and increasing the output efficiency.

In Fig. 7 a square wave generator 51 energizes the grid 52 of amplifier tube 53 through coupling condensers 54 and 56. This tube is connected to a plate voltage source through resistor 77 and to common bus 67 through two resistors 78 and 79. The output is taken from plate and cathode through coupling condensers 59 and 61 and feeds thermionic diodes 57 and 58 in series aiding relationship. Resistors 62, 63 and 64 are connected in shunt with the diodes, and an adjustable midtap 66 is led to return bus 67. The measuring circuit consists of the equivalent resistances for the open and closed condition between points 68 and 66, the resistor 69, signal source 71 which may be of either polarity, and return bus 67. The load 72, which may be an alternating current amplifier, is coupled through condenser 73 to output points 68 and 83.

Condensers 59 and 61 should be of such size in relation to the output frequency of generator 51 that the voltage between points 74 and 76 will not drop appreciably during a half cycle. Resistor 77 should equal the sum of resistors 78 and 79, and should be of such value considered with the values of resistors 62, 63 and 64 that the greatest output voltage will be secured for a given magnitude of signal, as limited by diode current, which is preferred to be of the order of two milliamperes. Resistance 69 should be large compared with the internal resistance 81 of the signal source 71.

The functioning of this circuit is similar to that of Fig. 1, although the latter may be regarded as maintaining constant current through network 14 during any half cycle while the former maintains constant voltage across points 74 and 76, Fig. 7. However, the equivalent circuit of Fig. 2 applies as well to both embodiments of the invention, and the description of the functioning of Fig. 2 given above applies as well in the circuit of Fig. 7. Zero adjustment is accomplished as in the circuit of Fig. 1 and great stability of zero adjustment over long periods of time is likewise achieved with the circuit of Fig. 7, this stability constituting a principal utility.

What is claimed is:

1. A device for converting a direct current electrical quantity to a proportional alternating current electrical quantity comprising, a pair of resistive elements which have a greater resistance to current flow in one direction than to current flow in the other connected in series aiding relation, a resistor connected in shunt to said pair of resistive elements forming a bridge circuit therewith, a circuit including a source of signals representative of a direct current quantity and an output resistor connected between the juncture of said pair of resistive elements and an intermediate terminal of said first-mentioned resistor, a source of alternating current voltage connected to the remaining terminals of said bridge network, and circuit means for deriving an alternating current electrical quantity from the circuit including said output resistor.

2. A device according to claim 1 in which said pair of resistive elements which have a greater resistance to current flow in one direction than in the other consist of rectifying elements.

3. A device according to claim 1 in which the intermediate terminal of said first-mentioned resistor is variably adjustable in its electrical position along the length of the resistor, whereby a stable and permanent correspondence of output zero setting to an input zero condition may be achieved.

4. A device for converting a direct current electrical quantity to a proportional alternating current electrical quantity comprising, a pair of rectifier elements connected in series aiding relation, a resistor connected in shunt to said pair of rectifier elements forming a bridge circuit therewith, a circuit including a source of signals representative of a direct current quantity and an output resistor in series therewith connected between the juncture of said rectifier elements and an intermediate terminal of said first-mentioned resistor, a source of alternating current voltage connected to the remaining terminals of said bridge network and circuit means for deriving an alternating current electrical quantity from the circuit including said output resistor, said output resistor having a magnitude of resistance intermediate the maximum and minimum values of resistance offered by the bridge circuit between the juncture of the rectifiers and intermediate terminal of said first-mentioned resistor.

5. A device according to claim 4, in which the voltage produced by said alternating current voltage source has a square waveform and which has an amplitude at least twice the magnitude of the signals representative of the direct current quantity.

6. A device according to claim 4 in which the rectifier elements comprise crystal rectifiers.

7. A device according to claim 4 in which the rectifier elements comprise thermionic tubes.

8. A device for converting a direct current electrical quantity to a proportional alternating current electrical quantity comprising, a pair of rectifier elements connected in series aiding relation, a resistor connected in shunt to said pair of rectifier elements forming a bridge circuit therewith, a circuit including a source of signals representative of a direct current quantity and an output resistor in series therewith connected between the juncture of said rectifier elements and an intermediate terminal of said first-mentioned resistor, a source of alternating current voltage connected to the remaining terminals of said bridge network through resistor means and circuit means for deriving an alternating current electrical quantity from the circuit including said output resistor.

9. A device according to claim 8 in which said output resistor has a magnitude of resistance intermediate the maximum and minimum values of resistance offered by the bridge circuit between the juncture of the rectifiers and the intermediate terminal of said first-mentioned resistor.

10. A device according to claim 8 in which the resistor means connected between the alternating current source and the bridge network has a magnitude of resistance which is large relative to that of said first-mentioned resistor.

11. A device for converting a direct current electrical quantity to a proportional alternating current electrical quantity comprising, a pair of rectifier elements connected in series aiding relation, a resistor connected in shunt to said pair of rectifier elements forming a bridge circuit therewith, a circuit including a source of signals representative of a direct current quantity and an output resistor in series therewith connected between the juncture of said rectifier elements and an intermediate terminal of said first-mentioned resistor, a source of alternating current voltage, a coupling circuit connecting said alternating current voltage source to said bridge network including a thermionic tube having at least anode, cathode and control electrodes, a resistor connected in the cathode circuit, a resistor of substantially equal value connected in the anode circuit, circuit means coupling the anode and cathode to opposite terminals of said bridge network, circuit means connecting said alternating current source to the input of said thermionic tube and circuit means for deriving an alternating current electrical quantity from the circuit including said output resistor.

JOHN W. GRAY.

REFERENCES CITED

The following references are of record in the file of this patent:

UNITED STATES PATENTS

| Number | Name | Date |
|---|---|---|
| 581,091 | Wappler | Apr. 20, 1897 |
| 1,574,350 | Johnson | Feb. 23, 1926 |
| 2,148,718 | Agins | Feb. 28, 1939 |